(12) United States Patent
Arteaga et al.

(10) Patent No.: US 8,390,451 B2
(45) Date of Patent: Mar. 5, 2013

(54) CENTRALIZED RFID READER CONTROL AND COORDINATION

(75) Inventors: Carlos Arteaga, Roswell, GA (US); Franky Martin, Alpharetta, GA (US)

(73) Assignee: iAnywhere Solutions, Inc., Dublin, CA (US)

( * ) Notice: Subject to any disclaimer, the term of this patent is extended or adjusted under 35 U.S.C. 154(b) by 1129 days.

(21) Appl. No.: 11/874,554

(22) Filed: Oct. 18, 2007

(65) Prior Publication Data

US 2009/0102675 A1    Apr. 23, 2009

(51) Int. Cl.
*G08B 13/14* (2006.01)

(52) U.S. Cl. ............... 340/572.1; 340/10.1; 340/10.2

(58) Field of Classification Search .......... 340/500–505, 340/540, 568.1, 572.1–572.9, 10.1; 235/375–385
See application file for complete search history.

(56) References Cited

U.S. PATENT DOCUMENTS

| | | | | |
|---|---|---|---|---|
| 6,313,745 B1 * | 11/2001 | Suzuki | | 340/572.1 |
| 6,677,852 B1 * | 1/2004 | Landt | | 340/10.1 |
| 6,714,133 B2 * | 3/2004 | Hum et al. | | 340/573.4 |
| 6,842,116 B2 * | 1/2005 | Hum et al. | | 340/573.4 |
| 7,057,512 B2 * | 6/2006 | Stilp | | 340/572.1 |
| 2006/0022800 A1 * | 2/2006 | Krishna et al. | | 340/10.2 |
| 2007/0052524 A1 * | 3/2007 | Tanaka | | 340/10.2 |
| 2007/0126554 A1 * | 6/2007 | Choi et al. | | 340/10.1 |
| 2009/0012882 A1 * | 1/2009 | Sarangapani et al. | | 705/28 |

* cited by examiner

*Primary Examiner* — Brian Zimmerman
*Assistant Examiner* — James Yang
(74) *Attorney, Agent, or Firm* — Sterne, Kessler, Goldstein & Fox PLLC

(57) ABSTRACT

Systems, methods and computer program products for the centralized control of radio frequency identification (RFID) readers are described herein. An input event control embodiment operates by receiving a signal from a non-RFID input device and commanding an RFID reader associated with the non-RFID input device to begin reading. According to an alternative time coordination embodiment, non-overlapping time slots are assigned to a plurality of RFID readers, and the RFID readers read only during their respective non-overlapping time slots. According to an alternative combined input event control/time coordination embodiment, non-overlapping time slots are assigned to a plurality of RFID readers. A signal from a non-RFID input device is received, and an RFID reader associated with the non-RFID input device is commanded to begin reading. However, such RFID reader only begins to read at the beginning of its next assigned time slot.

13 Claims, 7 Drawing Sheets

CENTRALIZED RFID READER CONTROL AND COORDINATION

BACKGROUND OF THE INVENTION

1. Field of the Invention

The present invention is generally directed to RFID readers, and more particularly to controlling RFID readers in a dense RFID reader environment.

2. Background Art

Radio-frequency identification (RFID) is a well known technology that includes RFID tags (also called transponders) and RFID readers (also called interrogators). An RFID tag may be attached to or incorporated in a product, person or other object for identification purposes. Data stored in RFID tags may be wirelessly accessed and read by RFID readers. Specifically, an RFID reader accesses or reads a tag by emitting an electromagnetic (EM) interrogation signal. The RFID tag responds by transmitting an EM signal containing its data.

Some applications require the placement of multiple RFID readers in a limited space. Such applications include, but are not limited to, inventory tracking systems and personnel tracking systems. Such dense reader environments are problematic, however, as EM interference may result if multiple RFID readers attempt to read at the same time.

Therefore, what is needed are systems, methods and computer program products for controlling RFID readers in a dense RFID reader environment such that reader interference is reduced.

BRIEF SUMMARY OF THE INVENTION

The present invention is directed to systems, methods and computer program products for the centralized control of radio frequency identification (RFID) readers. Briefly stated, an input event control embodiment of the invention operates by receiving a signal from a non-RFID input device. The non-RFID input device may be, for example, a motion sensor, heat sensor, or sound sensor. The invention then commands an RFID reader associated with the non-RFID input device to begin reading. However, such RFID reader is commanded to read only if the RFID reader has a priority higher than any interfering RFID reader.

According to an alternative time coordination embodiment, non-overlapping time slots are assigned to a plurality of RFID readers. Such RFID readers were previously determined to interfere with one another. The RFID readers read only during their respective non-overlapping time slots.

According to an alternative combined input event control/time coordination embodiment, non-overlapping time slots are assigned to a plurality of RFID readers. A signal from a non-RFID input device is received. An RFID reader associated with the non-RFID input device is commanded to begin reading. However, such RFID reader only begins to read at the beginning of its next assigned time slot.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
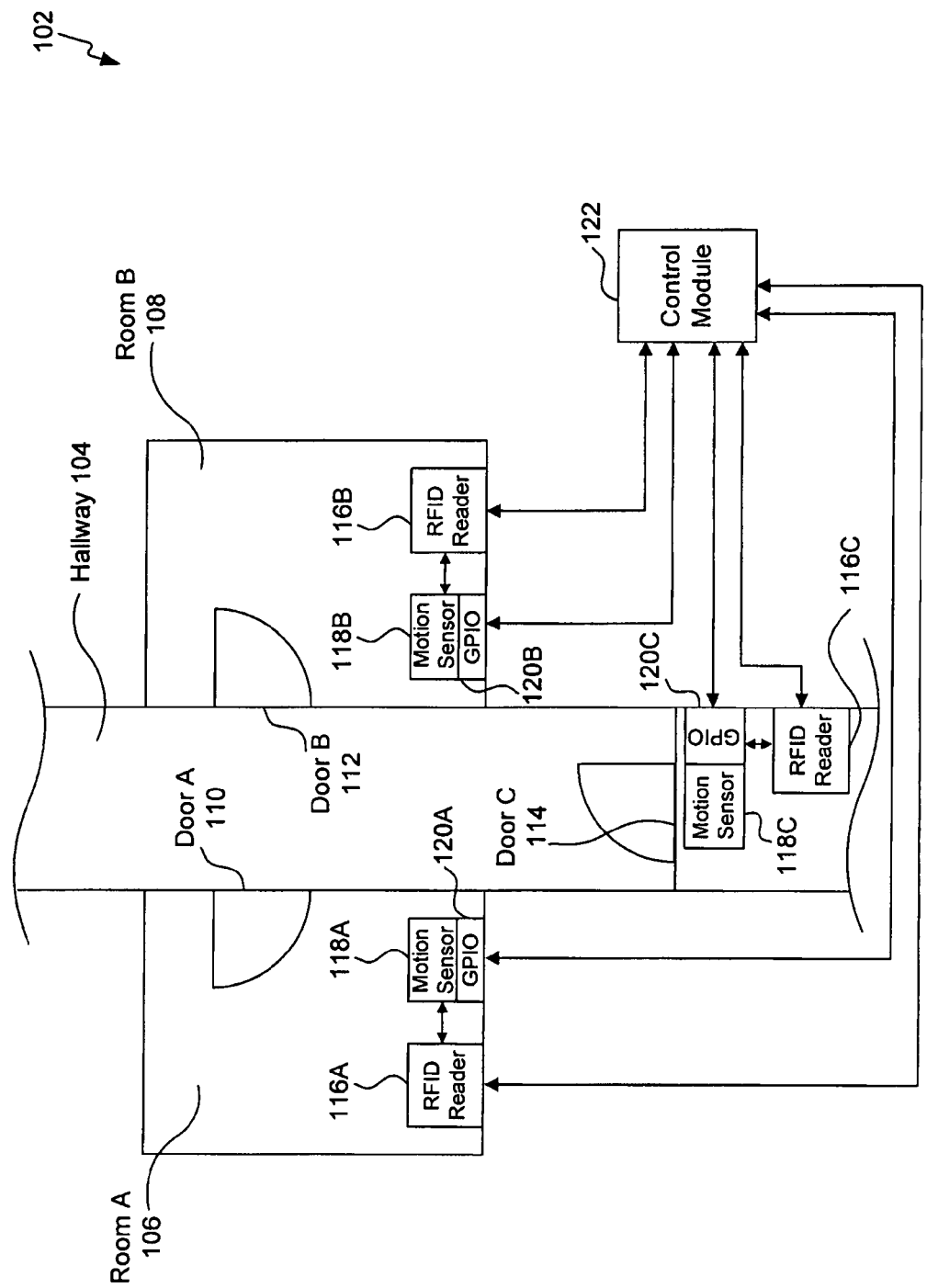
FIG. 1 illustrates a dense RFID reader environment according to an embodiment of the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

1. Overview

The present invention is directed to systems, methods and computer program products for controlling RFID readers to reduce, or even eliminate, reader interference. In an embodiment, the invention operates in dense RFID reader environments such as but not limited to inventory tracking systems and personnel tracking systems. However, the invention is not limited to these example embodiments. Instead, the invention is applicable to any environment where RFID reader interference exists.

According to embodiments of the invention, control of RFID readers is centralized. Specifically, RFID readers are passive devices that are controlled by a control module. The control module orchestrates and coordinates the operation of the RFID readers, and the RFID readers read only when they are so instructed by the control module. Accordingly, it is possible for the control module to reduce or even eliminate reader interference by ensuring that potentially interfering RFID readers do not read at the same time. (As will be appreciated by persons skilled in the relevant arts, the operations performed by the control module as described herein may be distributed among a plurality of processing units.)

The invention provides additional advantages. For example, since readers read only when instructed, their useful life is greater than readers that read continuously, or for long time periods. Also, the invention is environment-friendly since readers read only for short periods of time (when so instructed by the control module).

Additionally, due to the centralized nature of the invention, the control module is able to allocate read resources in a more intelligent and effective manner. For example, there may be situations where a given reader may need to read for an extended time period. In such cases, the control module can permit that reader to read while preventing reading by adjacent readers, thereby allocating read resources where needed, while preventing reader interference.

Generally speaking, the embodiments presented below are described with reference to RFID readers each having a single antenna. However, the invention is not limited to this example embodiment. Instead, the invention is directed to the centralized control of RFID readers having multiple antennas. In this latter case, the embodiments presented below operate to control reading by each of a given RFID reader's antennas. In other words, not only does the invention control when a multiple antenna RFID reader reads, the invention also controls when each of the RFID reader's antennas is used to read.

Embodiments for achieving centralized control of RFID readers are described in the following sections.

2. Input Event Control

FIG. 1 illustrates a dense reader environment 102 according to an embodiment of the invention. Example environment 102 includes a hallway 104, Room A 106 and Room B 108. Door A 110 connects Room A 106 to hallway 104, and Door B 112 connects Room B 108 to hallway 104. Door C 114 represents an exit from the hallway 104.

In the example of FIG. 1, objects are identified using RFID readers 116. RFID readers 116 are controlled by a control module 122 based on input events. In an embodiment, such input events are not RFID related. In the example of FIG. 1, the input events are provided by motion sensors 118. Consider, for example, Room A 106. When a person opens Door A 110 and walks into Room A 106, motion sensor 118A senses the person's motion. Such detection causes motion sensor 118A to send a signal to control 122. In an embodiment, such signal is provided via a general purpose input/output (GPIO), but any well known interface could alternatively be used. Upon receipt of this signal, control module 122 commands RFID reader 116A to read. RFID reader 116A then reads and identifies the person who entered Room A 106 based on the person's RFID tag.

Accordingly, RFID readers 116 read only when so instructed by control module 122, and control module 122 only causes an RFID reader 116A to read upon receipt of a signal from a motion sensor 118A corresponding to (or associated with) the RFID reader 116A. In this manner, the invention reduces or even eliminates interference between RFID readers 116A, 116B, 116C that are proximate to one another.

It is noted that the above example was described with reference to motion sensors 118. However, the invention is not limited to this illustrative embodiment. As will be appreciated by persons skilled in the relevant art(s) based on the teachings contained herein, the invention is applicable to other types of well known sensors and input devices, such as but not limited to heat sensors, sound sensors, etc. In an embodiment, such sensors and/or input devices are non-RFID related (i.e., not RFID readers or based on RFID technology).

Figure 2:
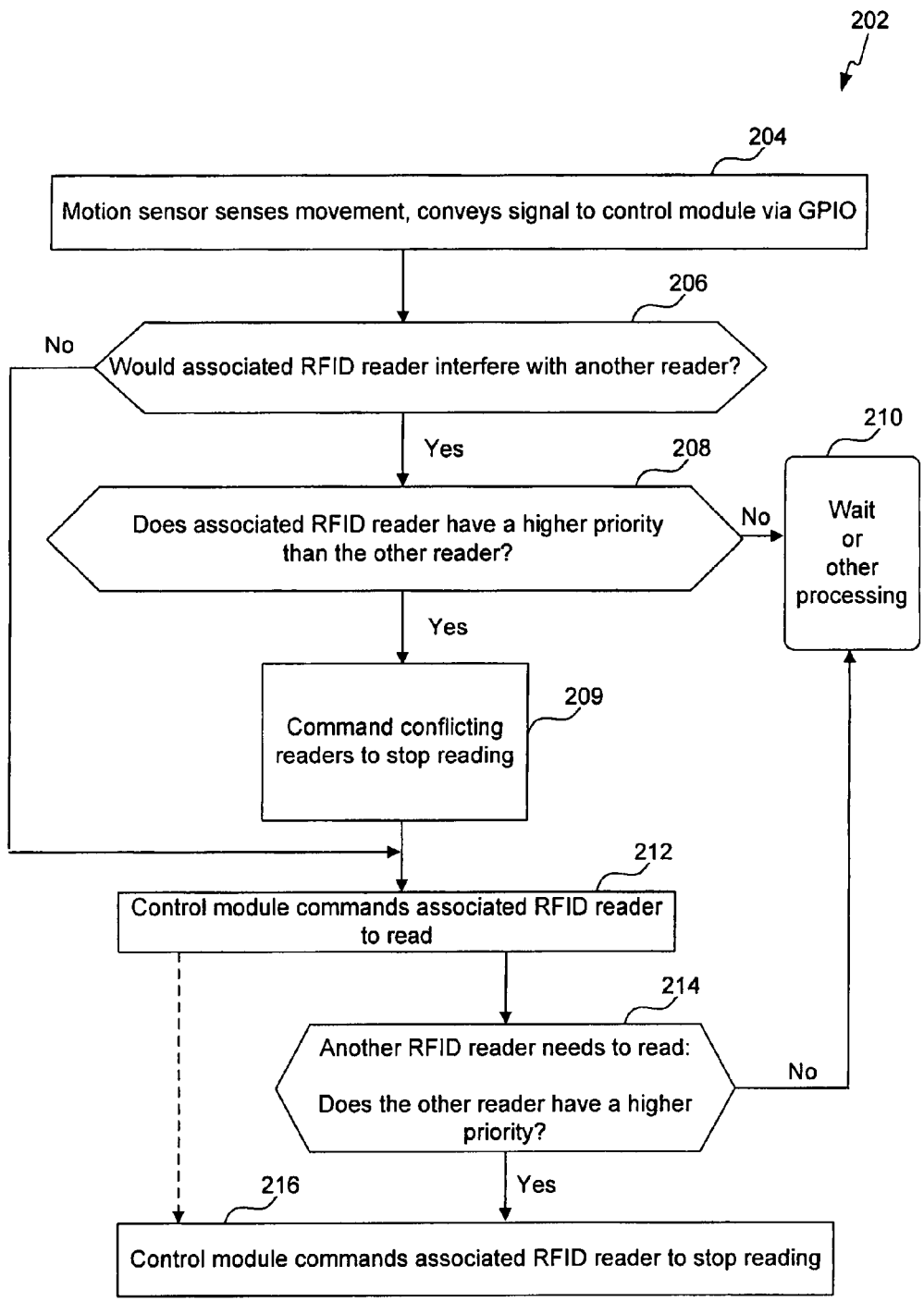
FIG. 2 is a flowchart illustrating an input event control approach for the centralized control of RFID readers according to an embodiment of the invention.

The operation of this embodiment shall now be described in greater detail with reference to flowchart 202 in FIG. 2. For illustrative but non-limiting purposes, this flowchart 202 shall be described with continuing reference to the example scenario where a person walks into Room A 106 from hallway 104 through Door A 110.

In step 204, motion sensor 118A senses movement of the person entering Room A 106, and sends a signal to control module 122 via GPIO 120A. In an embodiment, this signal may be achieved by causing an output of GPIO 120A (such as a pin of GPIO 120A) to change state (to go to a high value, for example).

In step 206, control module 122 determines whether interference would result if RFID reader 116A was instructed to begin reading. Interference might result, for example, if RFID reader 116B and/or RFID reader 116C were already reading. If control module 122 determines that interference would result if RFID reader 116A was instructed to begin reading, then step 208 is performed.

In step 208, control module 122 determines whether the RFID reader 116A associated with the motion sensor 118A that generated the signal in step 204 (referred to as the "associated reader") has a higher priority than RFID reader(s) 116 (referred to as "conflicting readers") that would conflict with such RFID reader 116A. Such priorities are pre-assigned to RFID readers 116 based on any number of implementation dependent criteria, such as the relative importance of rooms, the expected traffic through rooms, etc. If one or more of the conflicting readers 116B and/or 116C has a higher priority than the associated reader 116A, then step 210 is performed.

In step 210, control module 122 waits before instructing the associated reader 116A to begin reading. For example, control module 122 may wait until the conflicting readers 116B and/or 116C with higher priority than the associated reader 116A stop reading. Alternatively, other implementation dependent processing may be performed during step 210. For example, control module 122 may discard the signal from step 204 without instructing the associated reader 116A to read.

If, in step 208, control module 122 determines that the associated reader 116A has a higher priority than all conflicting readers 116B and/or 116C, then step 209 is performed. In step 209, control module 122 commands the conflicting readers 116B and/or 116C to stop reading.

Step 212 is performed after step 209. Step 212 is also performed after step 206, in the case where control module 122 determines that interference would not result if the associated RFID reader 116A was instructed to begin reading. In step 212, control module 122 instructs the associated RFID reader 116A to begin reading.

In an embodiment, there are a number of read commands that may be sent by control module 122:

StartRead: This command causes a RFID reader 116 to begin reading. The RFID reader 116 continues to read until it receives a "StopRead" command.

StopRead: This command causes a RFID reader 116 to stop reading. The control module 122 sends a StopRead command to discontinue a read previously initiated via a StartRead command. The control module 122 may also send StopRead commands during step 209, to stop conflicting readers 116B and/or 116C from further reading.

ReadWhileSignal: This command causes a RFID reader 116 to begin reading, and to continue reading while its associated motion sensor continues to sense motion (more generally, the RFID reader 116 continues to read while the sensor/input device generates a signal). In an embodiment, such functionality is achieved by connecting the RFID reader 116 to the output (or pin) of the associated GPIO 120 corresponding to a "motion" signal from the associated motion sensor 118. In an embodiment, the RFID reader 116 will also stop reading upon receipt of a StopRead command (see, for example, step 209).

OneTimeRead: The command causes a RFID reader 116 to read for a given predetermined duration, and to stop reading thereafter. RFID readers 116 were previously programmed with such predetermined duration. In an embodiment, the RFID reader 116 will also stop reading upon receipt of a StopRead command (see, for example, step 209).

Step 214 is performed if, while the associated reader 116A is still reading, control module 122 receives an indication that another reader 116B or 116C needs to read. For example, control module 122 may receive a signal from motion sensor 118B or 118C associated with such other reader 116B or 116C. In step 214, control module 122 determines whether such other reader 116B or 116C has a higher priority than the associated reader 116A that is currently reading. If such other reader 116B or 116C does not have a higher priority than the associated reader 116A, then step 210 is performed, wherein control module 122 waits before commanding such other reader 116B or 116C to begin reading (or takes other action, as described above).

If such other reader 116B or 116C has a higher priority than the associated reader 116A, then step 216 is performed. In step 216, control module 122 commands the associated reader 116A to stop reading. Control then moves to step 212, where control module 122 commands the other reader 116B or 116C to begin reading.

Step 216 is also performed after step 212, to stop a read that was initiated via a StartRead command. Accordingly, in step 216, control module 122 issues a StopRead command to the associated reader 116A. However, control module 122 need not issue such StopRead command until another reader with higher priority needs to read (as just described with respect to step 214). Accordingly, subject to a higher priority reader, control module 122 may allow the associated reader 116A to read as long as such reading is necessary (for example, as long as the associated motion sensor 118A detects movement in Room A 106). Accordingly, the centralized control methodology as described herein enables the invention to intelligently and efficiently allocate read time among RFID readers 116.

3. Time Coordination

Figure 3:
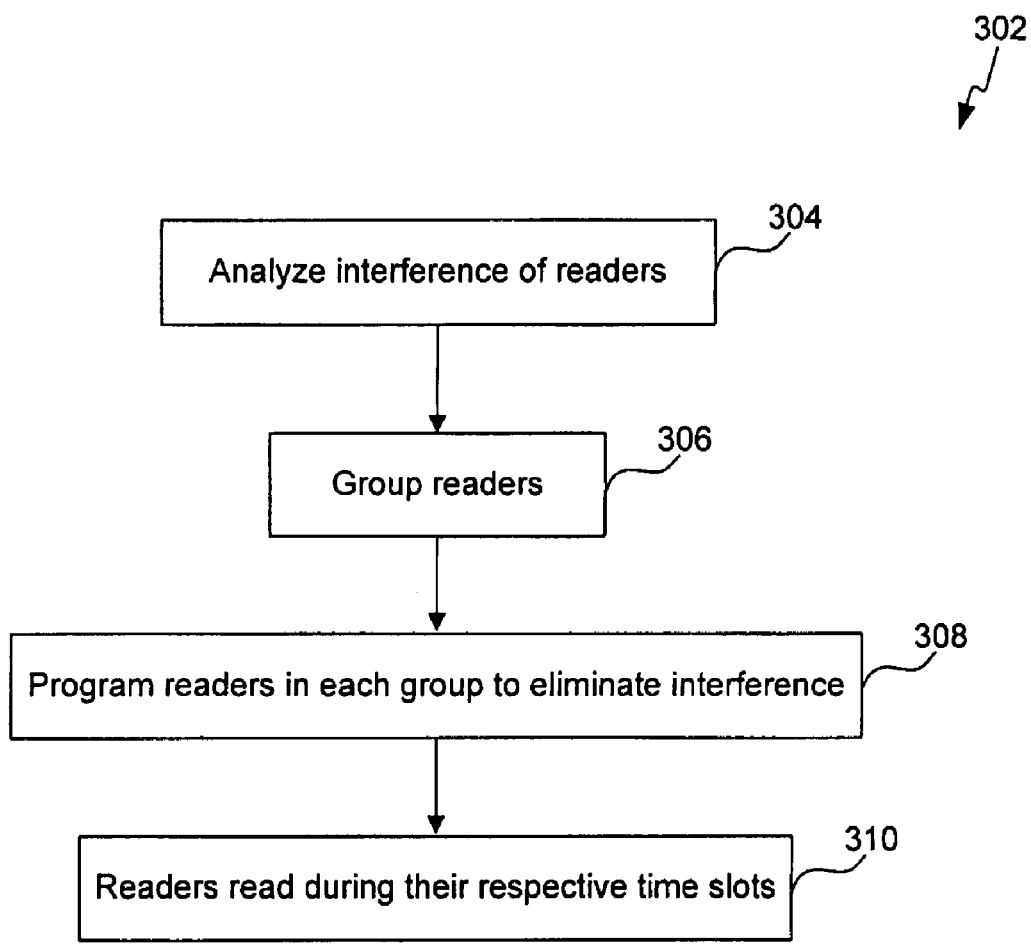
FIG. 3 is a flowchart illustrating a time coordination approach for the centralized control of RFID readers according to an embodiment of the invention.

FIG. 3 is a flowchart 302 illustrating an alternative embodiment for controlling RFID readers 116. According to this alternative embodiment, readers 116 are assigned non-overlapping time slots in which to read. Because the time slots are non-overlapping, reader interference is avoided.

Flowchart 302 shall now be described, with continuing reference to the environment 102 of FIG. 1. It is noted that motion sensors 118 (or other input devices) and GPIO 120 (or other device interfaces) are not required for the embodiment of FIG. 3.

In step 304, environment 102 is analyzed to identify RFID readers 116 that may interfere with one another. In step 306, readers 116 that may interfere with one another are clustered together into one or more groups. In the example of FIG. 1, readers 116A, 116B and 116C are clustered together into a group since it is determined that they may interfere with one another due to their close proximity.

In step 308, the RFID readers 116 in a group are programmed to reduce or even eliminate reader interference. Specifically, the readers 116 in a group are assigned respective time slots in which to read. Such time slots are non-overlapping, so no more than one RFID reader 116 in a group is reading during any given time slot. Accordingly, reader interference is reduced or even eliminated.

In step 310, the RFID readers 116 in each group are instructed to begin reading in accordance with the programming of step 308.

Example reader programming is provided in Table 1.

TABLE 1

Example RFID Reader Programming

| Reader | Programming |
| --- | --- |
| RFID Reader 116A | Number of Entries: 1 |
|  | Read Duration: 500 ms |
|  | Sleep Duration: 1000 ms |
|  | Offset: 0 ms |
| RFID Reader 116B | Number of Entries: 1 |
|  | Read Duration: 500 ms |
|  | Sleep Duration: 1000 ms |
|  | Offset: 500 ms |
| RFID Reader 116C | Number of Entries: 1 |
|  | Read Duration: 500 ms |
|  | Sleep Duration: 1000 ms |
|  | Offset: 1000 ms |

Figure 4:
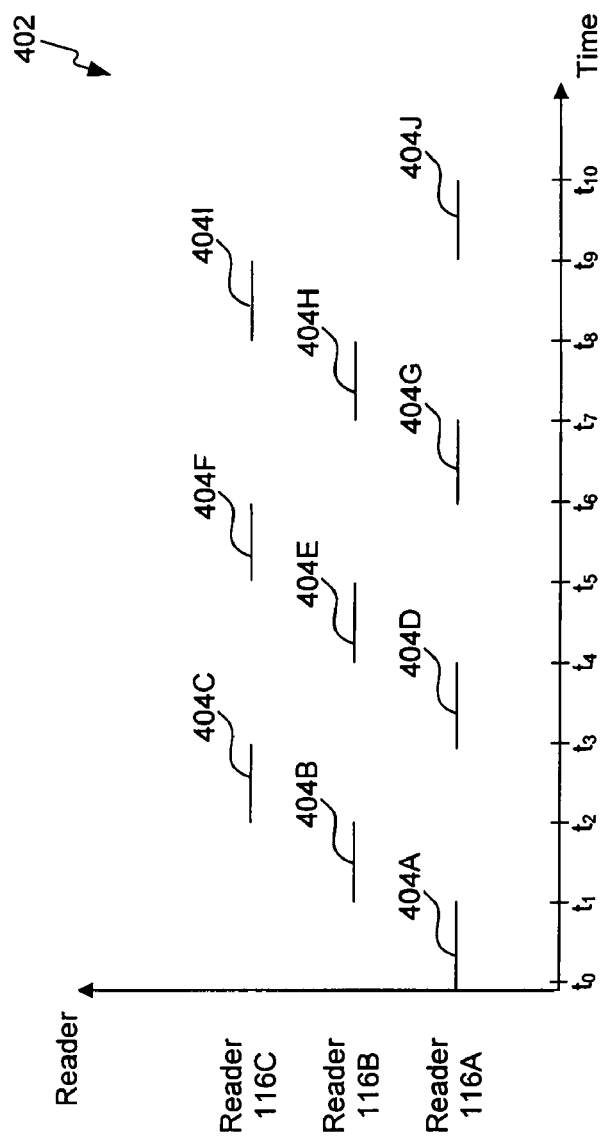
FIG. 4 is an example RFID reader timeline used to describe the time coordination approach of FIG. 3.

In the example of Table 1, all of the readers 116 are instructed to read for 500 ms (Read Duration), and then sleep (i.e., not read) for 1000 ms (Sleep Duration). However, reader 116A has an Offset of 0 ms. Readers 116B and 116C have Offsets of 500 ms and 1000 ms, respectively. These offsets are measured from a common clock. Accordingly, reader 116A begins reading at time t0. Reader 116B begins reading at time t0+500 ms, and reader 116C begins reading at time t0+1000 ms. Thereafter, this cycle repeats. Such operation is depicted in FIG. 4, where each time period 404 is equal to 500 ms.

4. Input Event Control and Time Coordination

The invention includes an alternative embodiment that comprises a combination of the input event control embodiment and time coordination embodiment described above in Sections 2 and 3, respectively. This combination embodiment operates in accordance with flowchart 202 of FIG. 2. However, step 212 is modified as follows.

Figure 5:
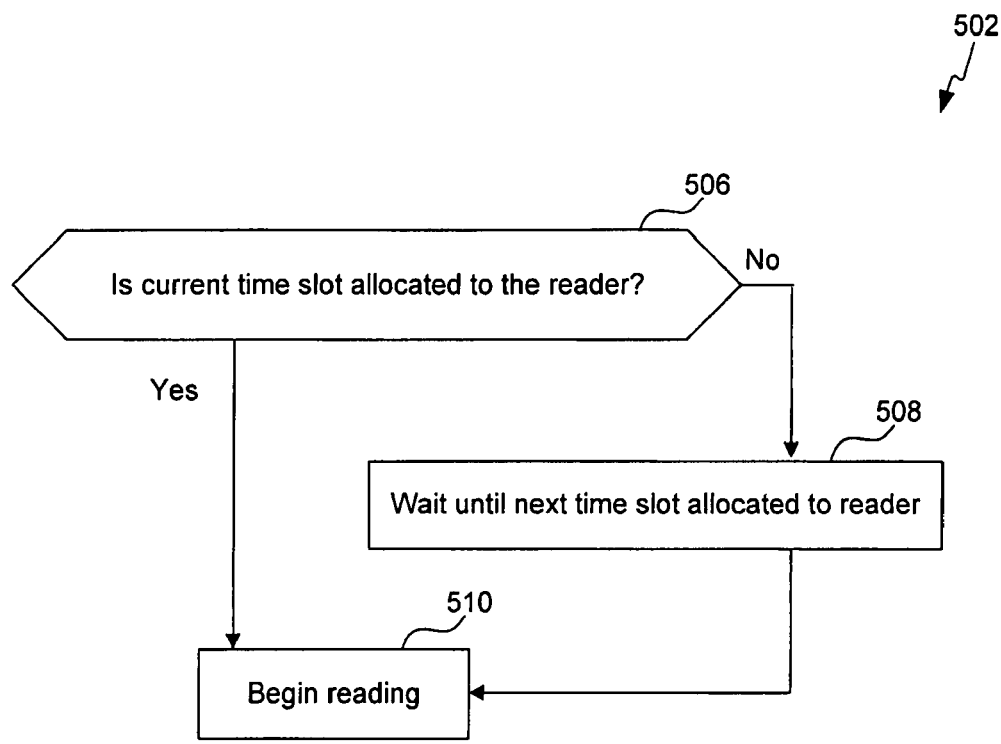
FIG. 5 is flowchart illustrating a combined input event control/time coordination approach for the centralized control of RFID readers according to an embodiment of the invention.

Specifically, when an RFID reader 116 receives a command from the control module 122 to begin reading, the RFID reader 116 performs the operations shown in flowchart 502 of FIG. 5. In step 506, the RFID reader 116 determines if the current time slot is one of its assigned time slots, in accordance with its programming (see step 308 of FIG. 3). If it has been allocated the current time slot, then the RFID reader 116 begins reading (step 510). Otherwise, the RFID reader 116 begins reading with its next allocated time slot (step 508).

Figure 6:
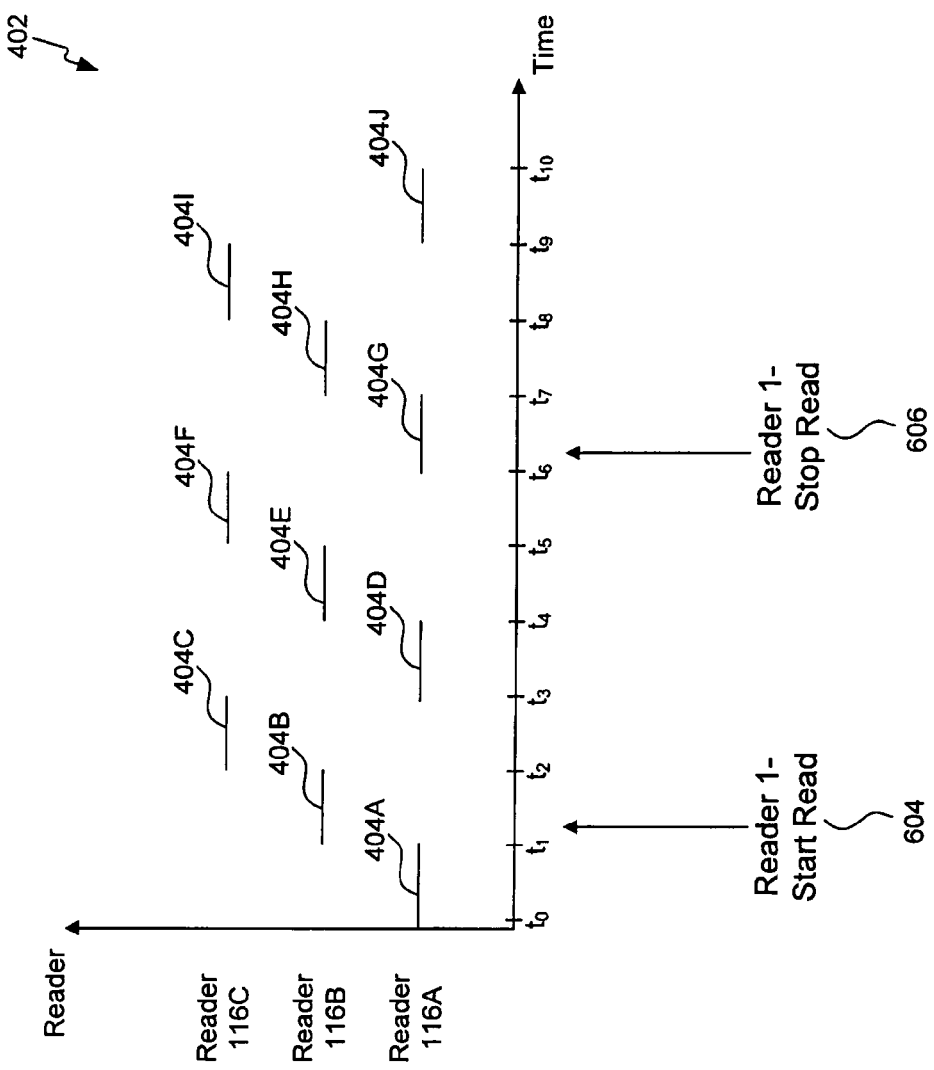
FIG. 6 is an example RFID reader timeline used to describe the combined input event control/time coordination approach of FIG. 5.

Such operation is depicted in the example of FIG. 6, which is a modified version of FIG. 4. As shown in the example of FIG. 6, RFID reader 116a receives a StartRead command 604 during time slot 404B. However, reader 116A does not begin reading because this time slot 404B is not allocated to reader 116A. Instead, reader 116A waits until time slot 404D to begin reading. Reader 116A sleeps (i.e., does not read) during time slots 404E and 404F. Reader 116A starts reading again at time t6, which marks the beginning of time slot 404G. However, prior to the end of time slot 404G, reader 116A receives a StopRead command 606 from control module 122. In response, reader 116A stops reading, even though its allocated time slot 404G is not yet complete.

5. Example Computer Embodiment

Figure 7:
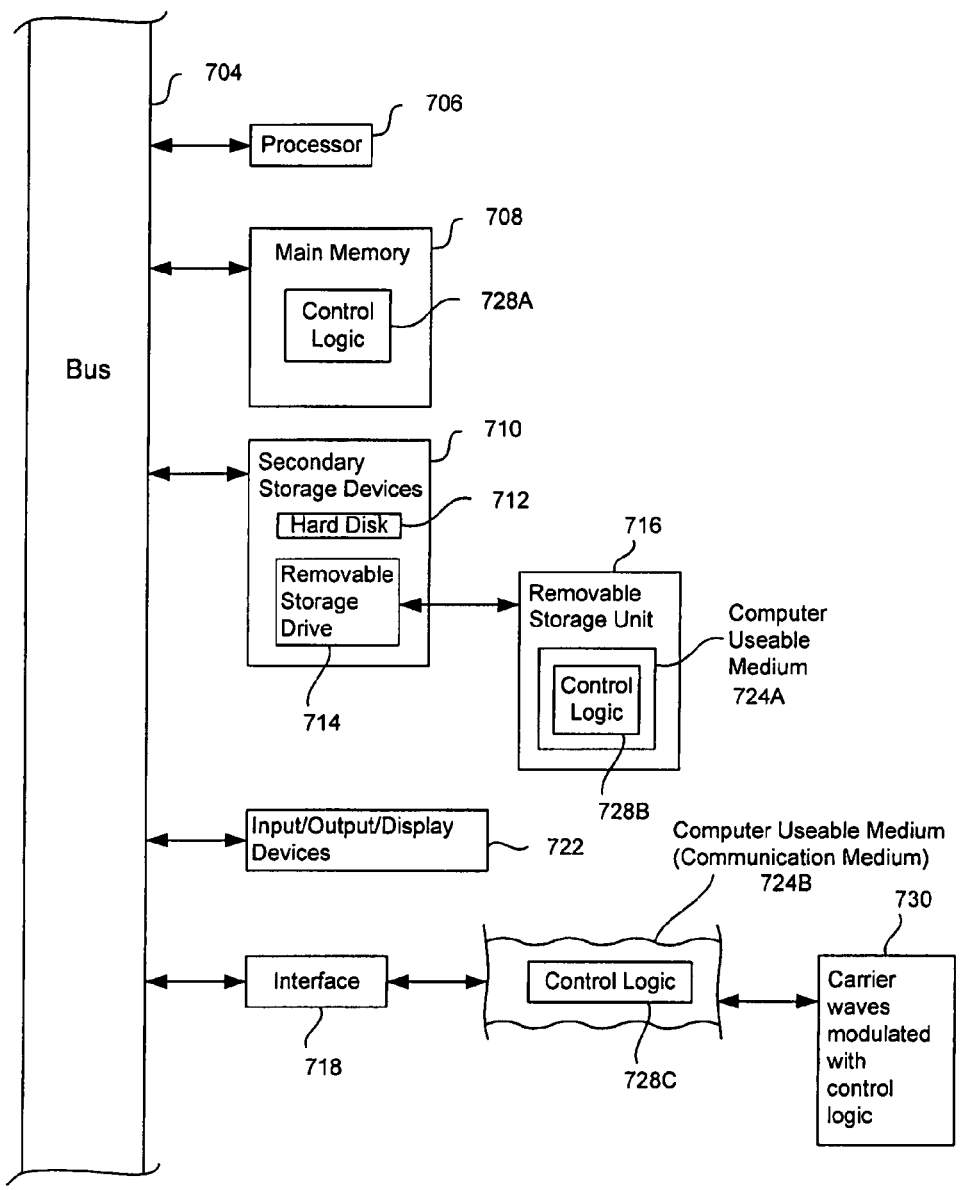
FIG. 7 illustrates an example computer useful for implementing components of the invention.

In an embodiment of the present invention, the system and components of the present invention described herein are implemented using well known computers, such as computer 702 shown in FIG. 7. For example, control module 122 can be implemented using computer(s) 702.

The computer 702 can be any commercially available and well known computer capable of performing the functions described herein, such as computers available from International Business Machines, Apple, Sun, HP, Dell, Compaq, Digital, Cray, etc.

The computer 702 includes one or more processors (also called central processing units, or CPUs), such as a processor 706. The processor 706 is connected to a communication bus 704.

The computer 702 also includes a main or primary memory 708, such as random access memory (RAM). The primary memory 708 has stored therein control logic 728A (computer software), and data.

The computer 702 also includes one or more secondary storage devices 710. The secondary storage devices 710 include, for example, a hard disk drive 712 and/or a removable storage device or drive 714, as well as other types of storage devices, such as memory cards and memory sticks. The removable storage drive 714 represents a floppy disk drive, a magnetic tape drive, a compact disk drive, an optical storage device, tape backup, etc.

The removable storage drive 714 interacts with a removable storage unit 716. The removable storage unit 716 includes a computer useable or readable storage medium 724 having stored therein computer software 728B (control logic) and/or data. Removable storage unit 716 represents a floppy disk, magnetic tape, compact disk, DVD, optical storage disk, or any other computer data storage device. The removable storage drive 714 reads from and/or writes to the removable storage unit 716 in a well known manner.

The computer 702 also includes input/output/display devices 722, such as monitors, keyboards, pointing devices, etc.

The computer 702 further includes a communication or network interface 718. The network interface 718 enables the computer 702 to communicate with remote devices. For example, the network interface 718 allows the computer 702 to communicate over communication networks or mediums 724B (representing a form of a computer useable or readable medium), such as LANs, WANs, the Internet, etc. The network interface 718 may interface with remote sites or networks via wired or wireless connections.

Control logic 728C may be transmitted to and from the computer 702 via the communication medium 724B. More particularly, the computer 702 may receive and transmit carrier waves (electromagnetic signals) modulated with control logic 730 via the communication medium 724B.

Any apparatus or manufacture comprising a computer useable or readable medium having control logic (software) stored therein is referred to herein as a computer program product. Examples of a computer program product include a computer program storage device which includes, but is not limited to, the computer 702, the main memory 708, secondary storage devices 710, and the removable storage unit 716. Further examples of a computer program product include a communication interface, including the carrier waves modulated with control logic 730. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

6. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method of controlling radio frequency identification (RFID) readers, comprising:
   receiving a signal from a first non-RFID input device;
   commanding a first RFID reader associated with said first non-RFID input device to begin reading responsive to receiving the signal only if said first RFID reader has a pre-assigned priority higher than any interfering RFID reader; and
   commanding said first RFID reader to stop reading if a second RFID reader with a pre-assigned priority higher than said first RFID reader needs to read.

2. The method of claim 1, wherein said first non-RFID input device is a motion sensor, heat sensor, or sound sensor.

3. A computer program storage device having instructions recorded thereon that, if executed by a computing device, cause the computing device to perform a method comprising:
   receiving a signal from a first non-RFID input device;
   commanding a first RFID reader associated with said first non-RFID input device to begin reading responsive to receiving the signal only if said first RFID reader has a pre-assigned priority higher than any interfering RFID reader; and
   commanding said first RFID reader to stop reading if a second RFID reader with a pre-assigned priority higher than said first RFID reader needs to read.

4. The computer usable storage device of claim 3, wherein said first non-RFID input device is a motion sensor, heat sensor, or sound sensor.

5. A computer program storage device having instructions recorded thereon that, if executed by a computing device, cause the computing device to perform a method comprising:
   assigning non-overlapping time slots to a plurality of RFID readers; and
   causing said RFID readers to begin reading responsive to an input event, wherein said RFID readers read only during their respective non-overlapping time slots and while instructed to read.

6. The computer usable storage device of claim 5, wherein said RFID readers were previously determined to interfere with one another.

7. A computer program storage device having instructions recorded thereon that, if executed by a computing device, cause the computing device to perform a method comprising:
   receiving a signal from a non-RFID input device; and
   commanding an RFID reader associated with said non-RFID input device to begin reading, wherein the RFID reader and at least one additional RFID reader were previously assigned non-overlapping time slots;
   wherein said RFID reader begins reading, responsive to the signal from the non-RFD input device, at the beginning of its next assigned time slot only if instructed to read.

8. The computer usable storage device of claim 7, wherein said non-RFID input device is a motion sensor, heat sensor, or sound sensor.

9. The computer usable storage device of claim 7, wherein said commanding comprises:

commanding said RFID reader associated with said non-RFID input device to begin reading only if said RFID reader has a pre-assigned priority higher than any interfering RFID reader.

10. The computer usable storage device of claim 7, said method further comprising:
commanding said first RFID reader to stop reading if a second RFID reader with a pre-assigned priority higher than said first RFID reader needs to read.

11. A system comprising:
a plurality of non-RFID input devices;
a plurality of RFID readers respectively associated with said non-RFID input devices, wherein said RFID readers were previously assigned non-overlapping time slots;
a control module that, upon receiving a signal from one of said non-RFID input devices, commands a RFID reader associated with said one of said non-RFID input devices to begin reading;
wherein said commanded RFID reader begins reading, responsive to the signal from the non-RFID input device, at the beginning of its next assigned time slot only if instructed to read.

12. The computer usable storage device of claim 5, wherein the input event is generated by a motion sensor, heat sensor, or sound sensor.

13. The computer usable storage device of claim 7, wherein the RFID reader and the at least one additional RFID reader were previously determined to interfere with one another.

* * * * *